United States Patent [19]

Tschudy

[11] E Re. 31,095

[45] Reissued Dec. 7, 1982

[54] AGITATOR CHAMBER

[75] Inventor: Donald B. Tschudy, Stark County, Ohio

[73] Assignee: The Hoover Company, North Canton, Ohio

[21] Appl. No.: 246,285

[22] Filed: Mar. 23, 1981

Related U.S. Patent Documents

Reissue of:

[64] Patent No.: 4,178,653
Issued: Dec. 18, 1979
Appl. No.: 872,646
Filed: Jan. 26, 1978

[51] Int. Cl.[3] ..... A47L 5/30
[52] U.S. Cl. ..... 15/383
[58] Field of Search ..... 15/344, 364, 366, 370, 15/372, 383, 384, 389–392

[56] References Cited

U.S. PATENT DOCUMENTS

| | | | |
|---|---|---|---|
| 969,441 | 9/1910 | Backer | 15/383 X |
| 1,708,242 | 4/1929 | Simpson | 15/366 |
| 3,688,339 | 2/1971 | Vincent et al. | 15/392 X |

*Primary Examiner*—Chris K. Moore
*Attorney, Agent, or Firm*—Gerald H. Kreske; Richardson B. Farley

[57] ABSTRACT

The invention is included in a nozzle having side exhaust so that its suction tube is connected to one side of the nozzle. A groove arrangement of part spiral configuration is made in the internal periphery of the nozzle to provide the nozzle air and entrained dirt with a motion tending to move the air and entrained dirt towards the connecting suction duct. This is occasioned by the agitator brush configuration moving air and entrained dirt in a rotary direction which movement is interrupted by the groove and then moved along it. In addition, the cross sectional dimensioning of the nozzle arrived at tends to provide a substantially constant velocity of air flow to insure a relatively even suction effect completely across the lateral extent of the nozzle mouth.

8 Claims, 8 Drawing Figures

AGITATOR CHAMBER

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to floor care appliances and, more specifically, relates to nozzle configurations for nozzles utilized in such floor care appliances.

2. Description of the Prior Art

Although attempts at providing constant air velocity and pressure nozzles are broadly old, no one heretofore is known to have utilized the constant pressure, constant velocity structure to also actually direct the air and entrained dirt flow towards the suction connection. Thus, these two concepts are combined in a nozzle so that the structure utilized for the combined functions is one and the same and so that the combined cleaning effect afforded by this structure is additive as to each and not subtractive as to either.

Accordingly, it would seem advantageous to provide such a nozzle structure having the advantages of both substantially uniform air suction and dirt pick up, heightened by a directed air path configuration.

It would be still a further advantage to utilize a single composite nozzle structure in which the unitary configuration of it would provide both of these advantages.

It would be still further advantageous to provide a nozzle with an angled ledge which would yield in conjunction with the agitator, a directed a effect to the air and entrained dirt to move it towards the suction tube connection for the nozzle.

It would, additionally, be advantageous to provide an expanding groove to increase the cross sectional area of the nozzle, as it approached its suction tube, to provide, as much as possible, for a uniform velocity and pressure of suction air across the nozzle mouth to promote uniform cleaning.

SUMMARY OF THE INVENTION

The invention is comprehended in a nozzle for an upright cleaner or the like in which suction is supplied to the nozzle at one side thereof instead of medially of it. A separate agitator housing is mounted in the nozzle and may be of molded plastic or the like and includes a groove at its rear side providing a contoured section moved radially outwardly from the rest of the internal periphery of the agitator housing.

This groove takes the form of an expanding wedge of small size at the remote end of the agitator housing, uniformly expanding towards the suction tube end and with a wall adjoining the main agitator body that includes a substantially smoothly curved configuration to truncate the internal cylindrical surface of the agitator housing smoothly.

Because of the groove and the ledge formed thereby, rotation of the brush tends to move air and entrained dirt along the ledge towards the suction connection for the agitator housing.

The wedge shape cutoff also provides an increasingly expanding cross sectional area of nozzle as one approaches the nozzle suction tube so that the increasing volume of air entering the agitator housing is accommodated by this increasing volume. This tends to maintain the velocity and pressure across the nozzle face substantially constant so that dirt pickup is generally even across the nozzle working face. This eliminates skips as the rug over which it is moved is cleaned by the user of the cleaner.

DESCRIPTION OF THE DRAWINGS

Reference may now be had to the accompanying drawings for a better understanding of the invention, both as to its organization and function, with the illustration being of a preferred embodiment, but being only exemplary, and in which.

DETAILED DESCRIPTION OF THE INVENTION

Figure 1:
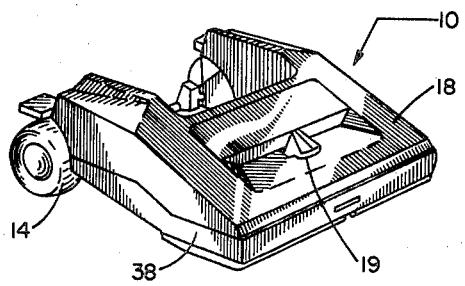
FIG. 1 is a perspective view of the nozzle arrangement.
Figure 2:
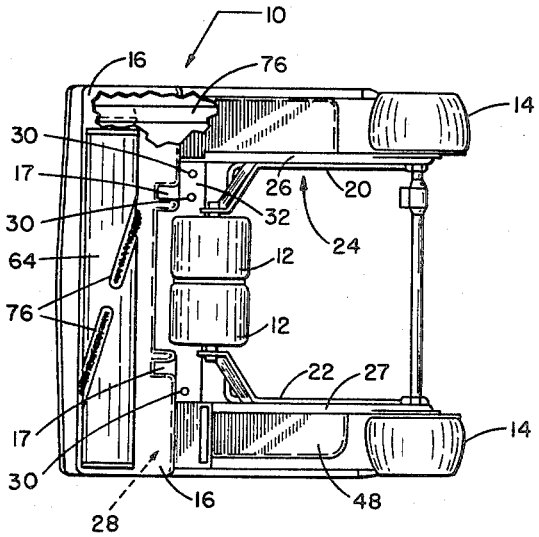
FIG. 2 is a bottom plan view of the nozzle and agitator housing.

There is shown in FIGS. 1 and 2, a nozzle 10 having forward wheels 12, 12, and rear wheels 14, 14. The nozzle 10 includes a bottom plate 16 removably attached to the nozzle 10 by conventional spring catches 17, 17. The nozzle 10 also includes a housing 18 which encompasses the working parts of the nozzle and gives it a general pleasing appearance and may also include a height adjustment knob 19 attached to mechanism (not shown) to vary the height of the housing 18 above the floor.

The wheels 12, 12 and 14, 14 are mounted on a framework 20 including a pair of bent struts 22, 22 that place the forward wheels 12, 12 toward the medial portions of the nozzle 10 to provide better tracking from the nozzle 10. The frame-work 20 and wheels 12, 12, and 14, 14 form a carriage 24 on which the remainder of the nozzle 10 is pivotally mounted.

This pivotal relationship is furnished through the aegis of a pair of elongated struts 26, 26 that are affixed to the remainder of the nozzle 10 and pivoted (not shown) to the carriage 24. A hard bag or soft bag arrangement or the like (not shown) can also be pivotally mounted to the carriage 24 (not shown) through the elongated struts 26, 26 to provide for the remainder of the cleaner. The pivotal arrangement of the struts 26, 26 to the carriage 24 and the upper hard or soft bag arrangement and pivot arrangement form no part of the invention and are substantially conventional, an example of the same being seen in U.S. Pat. No. 3,581,591, owned by a common assignee. No further description of this structure will, therefore, be given.

Turning now to a more thorough description of the nozzle 10, it can be seen that the forward portions of it encompass an agitator housing 28, preferably of molded configuration, that is firmly attached to the nozzle 10 through the use of screws or rivets 30 extending through brackets 32 and 34 situated on opposite sides of the agitator housing 28. The brackets 32 and 34 are generally L-shaped in elevation so that they can provide an easily adaptable securement means for the housing, with horizontal portions of their L-shapes mounting the rivets or screws 30 to secure the agitator housing 28 to the housing 18. The mounting for the agitator housing 28 is generally completed by a stepped forward wall 36 (FIG. 3) that abuts against the underside of the housing 18, the joint between these two members being obscured by a furniture guard 38 (FIG. 1) extending around the periphery of the housing 18 and attached thereto by any convenient conventional arrangement desired.

The inventive aspects of this Application will now be detailed.

Figure 3:
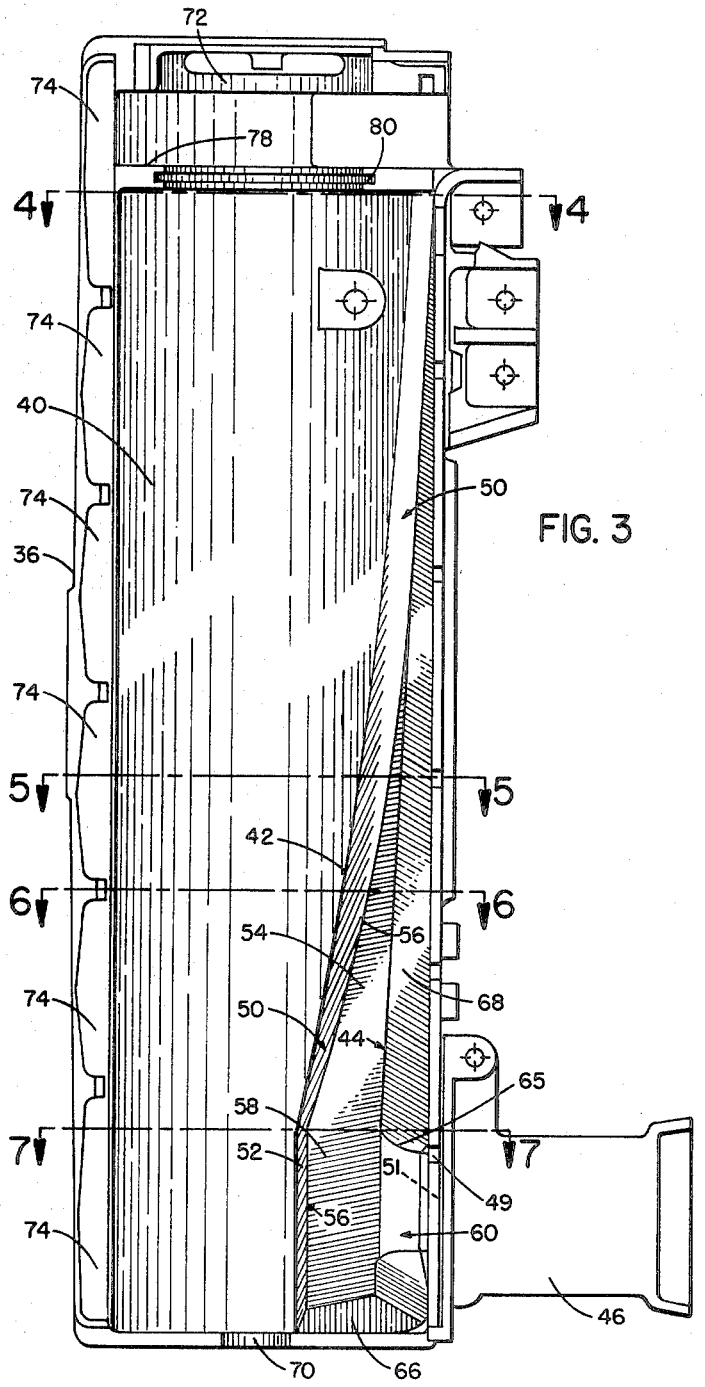
FIG. 3 is a plan view of the underside of the agitator housing with the agitator and bottom plate removed.
Figure 4:
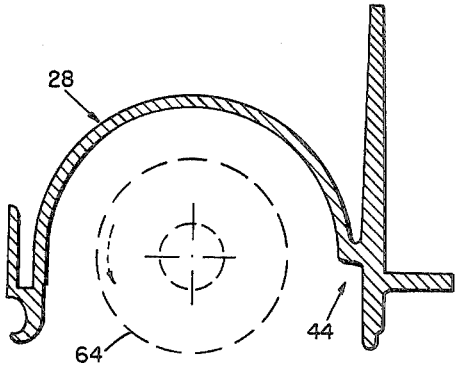
FIG. 4 is a cross sectional view of the nozzle taken on line 4—4 of FIG. 3 but oriented to operative position.
Figure 5:
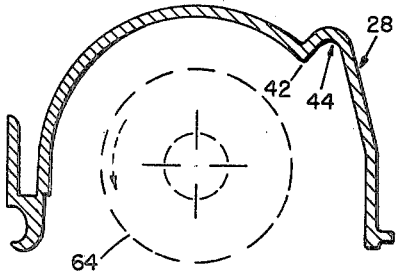
FIG. 5 is a cross sectional view of the nozzle taken on line 5—5 of FIG. 3 but oriented to operative position.
Figure 6:
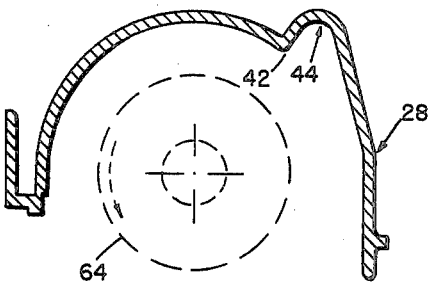
FIG. 6 is a cross sectional view of the nozzle taken on line 6—6 of FIG. 3 but oriented to operative position.
Figure 7:
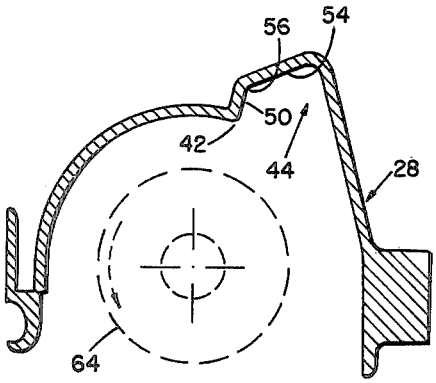
FIG. 7 is a cross sectional view of the nozzle taken on line 7—7 of FIG. 3 but oriented to operative position.
Figure 8:
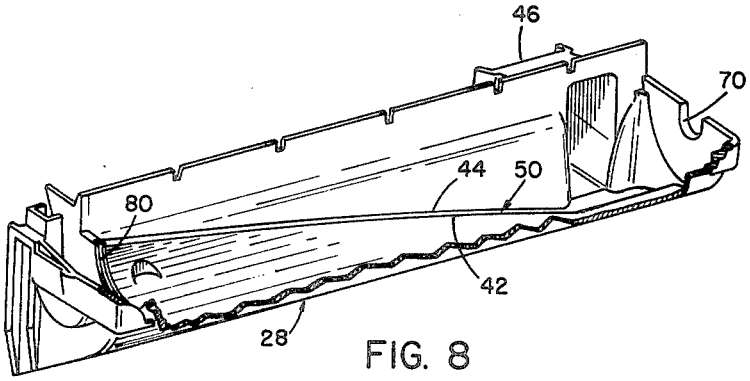
FIG. 8 is a partial perspective of the agitator housing.

It can be seen in FIG. 3, that the agitator housing 28 includes an internal cylindrical surface 40 as is conventional in the cleaner art but the same is abbreviated. This surface begins generally at the front of the agitator housing 28 and extending upwardly and circumferentially inwardly to terminate at an edge formed by an internal lip 42. This lip marks the boundary between cylindrical surface 40 and a groove 44 (actually molded in) that, in conjunction, with a ledge 50 and reversed helixed agitator 64 tending to move air along the groove 44 in the agitator housing 28 towards a tubular formed suction connection 46, also integral with the agitator housing 28. It should be noted that the groove serves partially as a stop for agitator entrained dirt during the cleaning operation. Suction connection 46, in turn, communicates rearwardly with a rigid nozzle suction duct 48 (FIG. 2) extending to the motor fan system (not shown) for the nozzle. The manner of sealing the suction connection 46 with the nozzle suction duct 48 may be any conventional arrangement desired.

The lip 42 is formed by the border termination of the angularly disposed generally flat wall, land or ledge 50 of groove 44, with this wall angling deeper and deeper inwardly (upwardly) towards the longitudinal center of the agitator housing as it approaches suction connection 46. At its other side wall 50 merges smoothly with the agitator housing 28. It terminates nearly aligned with one (the near) edge of an opening 51 of the agitator housing 46. The wall 50 terminates at this location to merge with a wall 52 that extends parallel to the plane of the opening 51. This prevents the wedge shape of the cutoff 44 from enlarging to thereby form an enlarged corner in which dirt and lint could lodge.

A secondary wall portion 54 of wall 50 extends from medially of the wall portion towards opening 51. This wall portion is angled at a lesser degree upwardly than wall 50 to limit the depth of cutoff 44 and thereby the requisite height of agitator housing 28. The adjacent border between wall 50 and wall portion 54 is formed by an edge 56. Wall portion 54 also terminates adjacent the near edge of opening 51, again to limit the wedge corner and also to provide a lead in and smooth transition to the opening 51. A flat parallel wall portion 58 joins to wall portion 54 and extends along cutoff 44 in the area of opening 51.

The agitator housing 28 is generally completed by a lead in section 60 for the suction connection 46. This includes smoothly curved small wall 65 and larger curved wall 66 which fills in and provides a fillet at one corner of the agitator housing 28 adjacent opening 51 to limit dirt and lint pileup adjacent suction connection 46.

It should be noted by the construction detailed that the lip 42, as it angles forwardly in the agitator housing 28 also angles upwardly so that it truncates the cylindrical periphery of internal cylindrical surface 40. It is slightly curved because of this truncation. In a similar manner edge 56 is also slightly curved. A wall portion 68 of generally cylindrical nature, as the cylindrical surface 40, is disposed behind the groove 44 to provide completion of the invention surface of agitator housing 28.

To complete the description of the agitator housing 28, the same can be seen as including agitator bearing supports 70 and 72 and a series of buck teeth 74, 74 disposed at the front of the agitator housing 28 provide a securement means for attachment of the bottom plate 16.

The cylindrical brush agitator 64, includes a series of spiralling brushes 76 which tend to more air and entrapped dirt towards the suction connection 46. The agitator 64 is driven by a belt 76 from one end of the aforesaid motor-fan system (not shown), a semi-circular flange wall 72 of agitator housing 28, as set out previously, serving to receive the agitator 64 seatingly for rotation of it during the cleaning operation. A seal (not shown) may be provided in a flange wall 78 in an arcuate slot 80 to seal the belt arrangement from suction imposed on the agitator housing 28. The remainder of this bearing (not shown) for this end of the agitator may be carried by the bottom plate 16, as is conventional.

The operation of the nozzle 10 should now appear obvious. Suction applied to suction connection 46 provides a flow of suction air through agitator housing 28. Because of the general wedge shape of the groove 44 the velocity and pressure across the face of the nozzle 10 tends to be relatively constant, the expanding cross section of the agitator housing 28, accommodating a larger and larger air flow as the suction connection 46 is approached. Additionally, because of the angled ledge 50 and the rotation of the agitator 64 with air and entrained dirt, the ledge tends to act as a step and air is squeezed along toward the suction connection. This effect is heightened by the helix configuration of the agitator 64. Additionally, the groove 44, it is felt, in some cases, acting in consort with the agitator provides a dirt stop so that the dirt is impinged and slowly moved along this edge to the suction connection.

It should now appear clear that the advantages of the invention, as set forth in the beginning of the description, have been fully complied with providing a nozzle with enhanced dirt pickup and a generally even pickup entirely across its face. It should additionally be obvious that many changes in structure could be made by one skilled in the art without resort to invention and that these changes would still fall within the spirit and purview of the description set forth.

What is claimed is:

1. An agitator housing for a floor care appliance including an air and entrained dirt entrance disposed at least partly around its periphery and having;

(a) an elongated chamber in said agitator housing, and having a rearwardly located suction opening communicating with said elongated chamber and through which said air and entrained dirt leave said chamber, (b) an agitator rotatably mounted in said chamber and tending to drive at least a portion of said air and entrained dirt, after its entrance about said periphery, in a generally circular path between said chamber and said agitator and about the axis of rotation of the latter, (c) a ledge exterior to said chamber communicating with said chamber and formed by a recess in the wall of said agitator housing exteriorly of said chamber and extending longitudinally thereof, said ledge being slanted upwardly towards the front of said chamber in the longitudinal direction to interrupt the driven movement of the air and entrained dirt in said path and to deflect said air and entrained dirt toward said rearwardly located suction opening, and (d) said agitator for driving air being disposed forwardly of said ledge and said rearwardly located suction opening, and in the flowpath of said air and entrained dirt from said entrance disposed around the periphery of said agitator housing to tend to carry, by its rotation, said air and entrained dirt against said ledge.

2. An agitator housing for a floor care applicance as set out in claim 1 wherein;

(a) said ledge expands in width longitudinally towards said rearardly located suction opening to provide an expanding pathway for flow of air and entrained dirt longitudinally of said chamber and to said rearwardly located suction opening, said expanding pathway exterior of said chamber and also formed by said recess in said wall of said agitator housing and tending to provide a generally constant air velocity flow into said elongated chamber along its periphery.

[3. An agitator housing for a floor care appliance including an air and entrained dirt entrance disposed around its periphery and having;

(a) an elongated chamber having an internal surface in said agitator housing and having a rearwardly located suction opening therein through which said air and entrained dirt leave said chamber, (b) an agitator rotatably mounted in said chamber and tending to drive air and entrained dirt, after its entrance about said periphery, in a generally circular path between said chamber and said agitator and about the axis of rotation of the latter, (c) a ledge formed exteriorly of said chamber by a recess in said agitator housing wall and extending longitudinally thereof, said communicating therewith, said ledge extending from said rearwardly located suction opening and interrupting movement of the air and entrained dirt in said path formed by said rotating agitator, (d) said ledge expanding in width longitudinally toward said rearwardly located suction opening to provide an expanding pathway for flow of air and entrained dirt longitudinally of said chamber and to said rearwardly located suction opening, said expanding pathway providing a generally constant air velocity flow into said elongated chamber along its periphery, and said agitator for driving air being disposed forwardly of said ledge and said rearwardly located suction opening.]

[4. An agitator housing for a floor care appliance including an air and entrained dirt entrance disposed around its periphery and having;

(a) an elongated chamber in said agitator housing with a rearwardly located suction opening communicating with said chamber and through which air and entrained dirt leave said chamber, (b) an elongated wall portion forming at least a part of the internal periphery of said elongated chamber, said rearwardly located suction opening being disposed in said wall portion, (c) an agitator rotatably mounted in said chamber forwardly of said wall portion and tending to drive air and entrained dirt entering around said periphery in a generally circular path between said chamber and said agitator and about the axis of rotation of the latter, and (d) a land formed in said chamber and extending longitudinally thereof toward said suction opening, said land being disposed against said elongated wall within said chamber to extend outwardly from said wall to provide an impinging surface to interrupt movement of the air and entrained dirt in said circular path caused by said rotating agitator and to deflect said air and entrained dirt toward said rearwardly located suction opening.]

*5. An agitator housing for a floor care appliance including;*

*(a) an agitator chamber of generally partially cylindrical internal periphery,*

*(b) a ledge formed along and in said partially cylindrical internal periphery and extending longitudinally therealong,*

*(c) a rotatable agitator in said agitator chamber,*

*(d) a suction opening in said agitator chamber,*

*(e) said agitator rotating against said ledge for moving air and entrained dirt towards said suction opening.*

*6. An agitator housing for a floor care appliance as set out in claim 5 wherein;*

*(a) said ledge is angled vertically along the longitudinal extent of said ledge.*

*7. An agitator housing for a floor care appliance as set out in claim 5 wherein;*

*(a) said ledge expands in width towards said suction opening.*

*8. An agitator housing for a floor care appliance as set out in claim 7 wherein:*

*(a) said ledge extends longitudinally for substantially the full longitudinal length of said agitator chamber,*

*(b) said expansion of said ledge is substantially continuous along said length.*

*9. An agitator housing for a floor care appliance including an air and entrained dirt entrance disposed around its periphery and having;*

*(a) an elongated chamber having an internal surface in said agitator housing and having a rearwardly located suction opening therein through which said air and entrained dirt leave said chamber,*

(b) an agitator rotatably mounted in said chamber and tending to drive air and entrained dirt, after its entrance about said periphery, in a generally circular path between said chamber and said agitator and about the axis of rotation of the latter,

*(c) a ledge formed exteriorly of said chamber by a recess in said agitator housing wall and extending continuously along substantially the full length of said agitator chamber and longitudinally thereof, and communicating therewith, said ledge extending from said rearwardly located suction opening and interrupting movement of the air and entrained dirt in said path formed by said rotating agitator,*

*(d) said ledge expanding in width longitudinally and continuously along its full length toward said rearwardly located suction opening to provide an expanding pathway for flow of air and entrained dirt longitu-*

*dinally of said chamber and to said rearwardly located suction opening, said expanding pathway providing a generally constant air velocity flow into said elongated chamber along its periphery, and said agitator for driving air being disposed forwardly of said ledge and said rearwardly located suction opening.*

*10. An agitator housing for a floor care appliance including an air and entrained dirt entrance disposed around its periphery and having;*

*(a) an elongated chamber in said agitator housing with a rearwardly located suction opening communicating with said chamber and through which air and entrained dirt leave said chamber,*

*(b) an elongated wall portion forming at least a part of the internal periphery of said elongated chamber, said rearwardly located suction opening being disposed in said wall portion,*

*(c) an agitator rotatably mounted in said chamber forwardly of said wall portion and tending to drive air and entrained dirt entering around said periphery in a generally circular path between said chamber and said agitator and about the axis of rotation of the latter, and*

*(d) a land formed in said chamber and extending longitudinally and generally vertically angularly along its longitudinal extent thereof toward said suction opening, said land being disposed against said elongated wall within said chamber to extend outwardly from said wall to provide an impinging surface to interrupt movement of the air and entrained dirt in said circular path caused by said rotating agitator and to deflect said air and entrained dirt toward said rearwardly located suction opening.*

* * * * *